(12) United States Patent
Garrett et al.

(10) Patent No.: US 9,655,158 B2
(45) Date of Patent: *May 16, 2017

(54) OVERLOADED COMMUNICATION SESSION

(71) Applicant: Google Inc., Mountain View, CA (US)

(72) Inventors: Maryam Garrett, Boston, MA (US); Shumeet Baluja, Leesburg, VA (US); Elad Gil, San Francisco, CA (US)

(73) Assignee: Google Inc., Mountain View, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 14/926,646

(22) Filed: Oct. 29, 2015

(65) Prior Publication Data

US 2016/0050708 A1 Feb. 18, 2016

Related U.S. Application Data

(63) Continuation of application No. 14/466,263, filed on Aug. 22, 2014, now Pat. No. 9,338,813, which is a continuation of application No. 11/186,438, filed on Jul. 21, 2005, now Pat. No. 8,849,752.

(51) Int. Cl.
*G06F 17/30* (2006.01)
*H04W 76/02* (2009.01)
*H04W 28/08* (2009.01)

(52) U.S. Cl.
CPC .... *H04W 76/025* (2013.01); *G06F 17/30864* (2013.01); *H04W 28/085* (2013.01)

(58) Field of Classification Search
CPC ........................................ H04L 47/10
See application file for complete search history.

(56) References Cited

U.S. PATENT DOCUMENTS

| 3,976,831 | A | 8/1976 | Danell et al. |
| 5,991,279 | A | 11/1999 | Haugli et al. |
| 6,009,410 | A | 12/1999 | LeMole et al. |
| 6,128,435 | A | 10/2000 | Galton |
| 6,157,935 | A | 12/2000 | Tran et al. |
| 6,160,875 | A | * 12/2000 | Park ........................ H04M 3/365 379/111 |
| 6,182,252 | B1 | 1/2001 | Wong et al. |
| 6,252,886 | B1 | 6/2001 | Schwager et al. |
| 6,401,085 | B1 | 6/2002 | Gershman et al. |

(Continued)

FOREIGN PATENT DOCUMENTS

WO    WO 99/45732    10/1999

OTHER PUBLICATIONS

Examiner Athina Nickitas-Etienne, International Preliminary Report on Patentability for Application No. PCT/US2006/028142, dated Mar. 26, 2009, 6 pages.

(Continued)

*Primary Examiner* — Mohammad S Rostami
(74) *Attorney, Agent, or Firm* — Fish & Richardson P.C.

(57) ABSTRACT

A method of providing information responsive to a request from a wireless communication device involves receiving an information request from a mobile device and generating responsive information for the information request, transmitting a first portion of the responsive information to the mobile device in a first communication session, and transmitting a second portion of the responsive information to the mobile device in a second, overloaded communication session.

20 Claims, 6 Drawing Sheets

(56) References Cited

U.S. PATENT DOCUMENTS

| | | |
|---|---|---|
| 6,411,810 B1 | 6/2002 | Maxemchuk |
| 6,469,991 B1 | 10/2002 | Chuah |
| 6,501,733 B1 | 12/2002 | Falco et al. |
| 6,519,464 B1 | 2/2003 | Santhoff et al. |
| 6,610,105 B1 | 8/2003 | Martin, Jr. et al. |
| 6,681,232 B1 | 1/2004 | Sistanizadeh et al. |
| 6,715,131 B2 | 3/2004 | Martin, Jr. et al. |
| 6,910,078 B1* | 6/2005 | Raman .............. H04L 29/06027 709/231 |
| 6,917,592 B1* | 7/2005 | Ramankutty ....... H04L 12/2856 370/237 |
| 6,956,834 B2 | 10/2005 | Stanwood et al. |
| 6,965,730 B2 | 11/2005 | Chamberlin et al. |
| 6,982,635 B2 | 1/2006 | Obradovich |
| 6,985,933 B1 | 1/2006 | Singhal et al. |
| 6,987,987 B1 | 1/2006 | Vacanti et al. |
| 7,031,713 B2 | 4/2006 | Schwinke |
| 7,031,720 B2 | 4/2006 | Weerakoon et al. |
| 7,043,210 B2 | 5/2006 | Zhu et al. |
| 7,149,528 B2 | 12/2006 | Lim et al. |
| 7,171,690 B2 | 1/2007 | Kouznetsov et al. |
| 7,188,159 B2 | 3/2007 | Ralston et al. |
| 7,200,384 B1 | 4/2007 | Tervo et al. |
| 7,260,087 B2 | 8/2007 | Bao et al. |
| 7,272,379 B1 | 9/2007 | Tang et al. |
| 7,280,975 B1 | 10/2007 | Donner |
| 7,283,823 B2 | 10/2007 | Pearce et al. |
| 7,324,543 B2 | 1/2008 | Wassew et al. |
| 2002/0078235 A1* | 6/2002 | Yen ..................... H04L 29/06 709/238 |
| 2002/0110097 A1* | 8/2002 | Sugirtharaj ........... H04W 28/20 370/329 |
| 2002/0143938 A1 | 10/2002 | Alexander et al. |
| 2002/0183020 A1 | 12/2002 | Zhu et al. |
| 2002/0186657 A1* | 12/2002 | Jain ........................ H04L 47/10 370/235 |
| 2003/0018540 A1 | 1/2003 | Volpi et al. |
| 2003/0084120 A1 | 5/2003 | Egli |
| 2003/0185186 A1 | 10/2003 | Tsutsumi et al. |
| 2004/0090916 A1 | 5/2004 | Hosein |
| 2004/0090919 A1 | 5/2004 | Callon et al. |
| 2004/0205149 A1 | 10/2004 | Dillon et al. |
| 2004/0249712 A1 | 12/2004 | Brown et al. |
| 2005/0060250 A1 | 3/2005 | Heller et al. |
| 2005/0094666 A1 | 5/2005 | Biyens et al. |
| 2005/0102703 A1 | 5/2005 | Querashi et al. |
| 2005/0182837 A1* | 8/2005 | Harris ................... H04L 67/10 709/226 |
| 2005/0192844 A1 | 9/2005 | Esler et al. |
| 2006/0010484 A1 | 1/2006 | Fujino |
| 2006/0020598 A1* | 1/2006 | Shoolman ........... H04L 67/1027 |
| 2006/0025125 A1 | 2/2006 | Hong et al. |
| 2006/0026169 A1 | 2/2006 | Pasqua |
| 2006/0069780 A1 | 3/2006 | Batni et al. |
| 2006/0073837 A1 | 4/2006 | Tanaka et al. |
| 2006/0075069 A1* | 4/2006 | Mohan .................. G06Q 10/10 709/218 |
| 2006/0101050 A1 | 5/2006 | Choy et al. |
| 2006/0176810 A1 | 8/2006 | Kekki |
| 2006/0182026 A1 | 8/2006 | Zhu et al. |
| 2006/0221825 A1 | 10/2006 | Okano |
| 2006/0262756 A1* | 11/2006 | Zehavi .................. H04B 7/216 370/335 |

OTHER PUBLICATIONS

The State Intellectual Property Office of the People's Republic of China, Notification of First Office Action (translation), Chinese Patent Application No. 200680034746.8, Feb. 5, 2010, 11 pages.

* cited by examiner

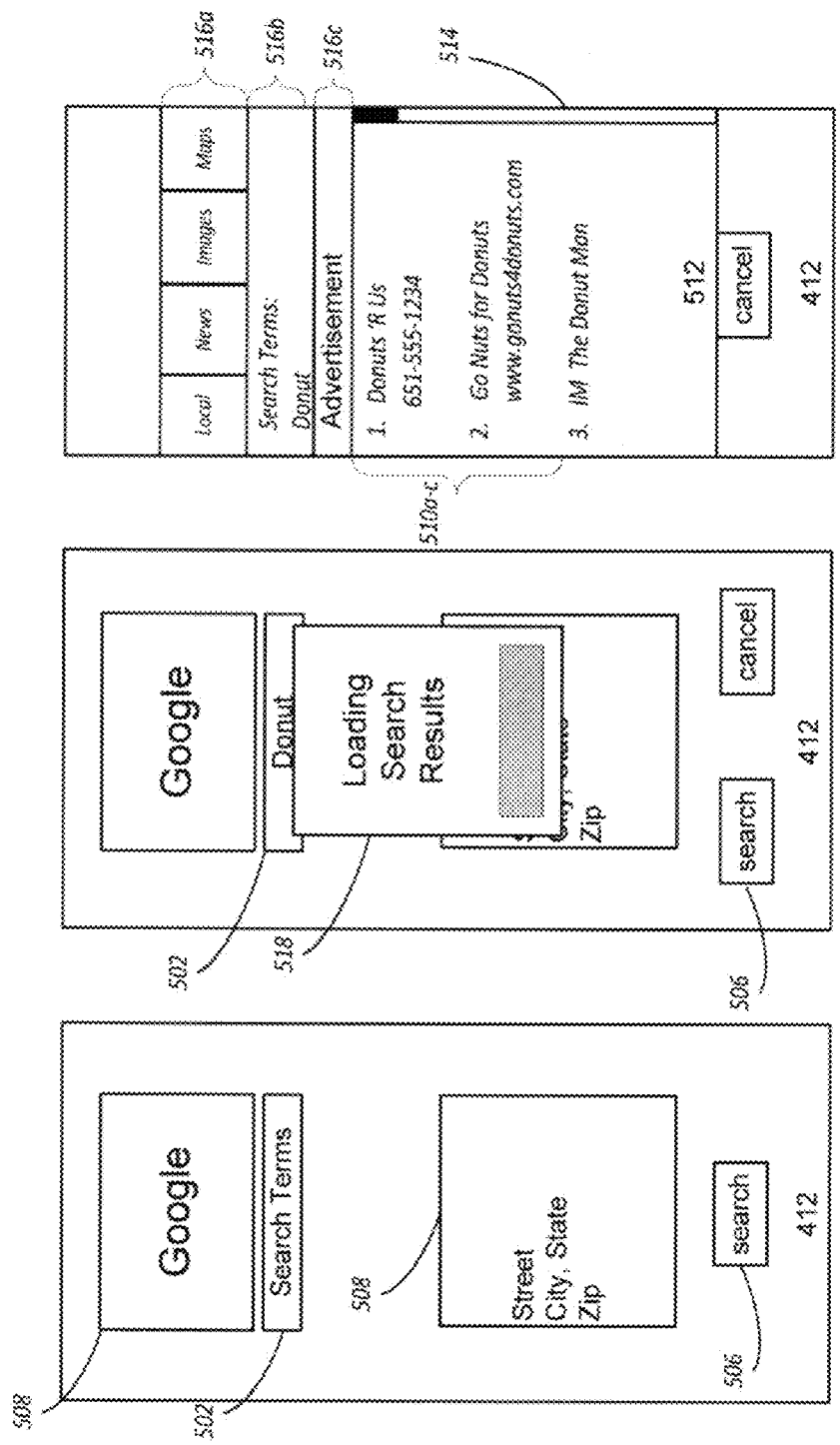

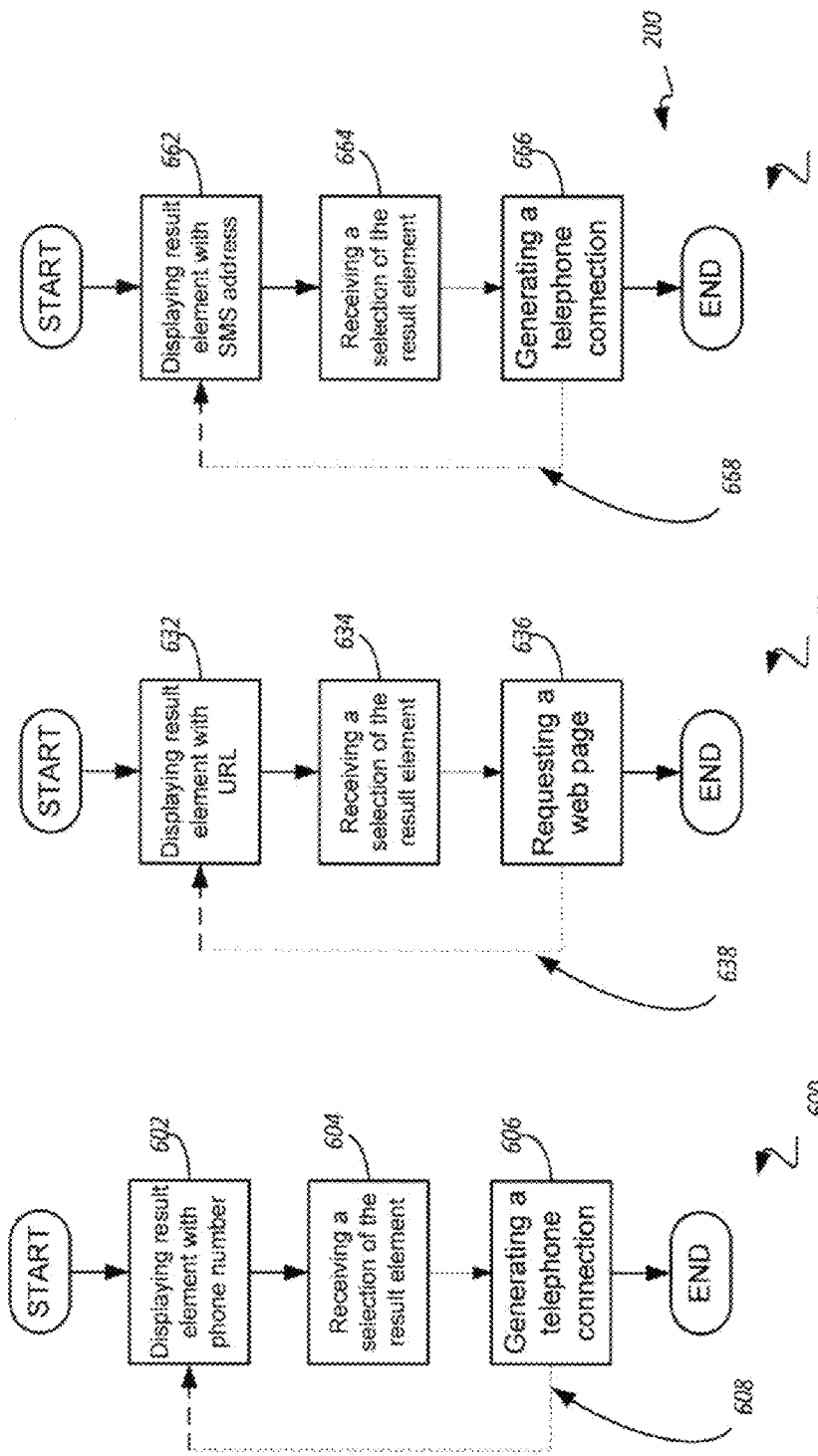

OVERLOADED COMMUNICATION SESSION

CROSS-REFERENCE TO RELATED APPLICATIONS

This application is a continuation application of, and claims priority to, U.S. patent application Ser. No. 14/466,263, titled "Overloaded Communication Session," filed on Aug. 22, 2014, which claims the benefit of priority to U.S. patent application Ser. No. 11/186,438, now U.S. Pat. No. 8,849,752, titled "Overloaded Communication Session," filed on Jul. 21, 2005. The disclosure of each of the foregoing applications is incorporated herein by reference.

TECHNICAL FIELD

This application relates to establishing connections to bandwidth-constrained communication and computing devices such as mobile telephones.

BACKGROUND

Mobile devices, such as cellular telephones, often have the capability to connect to the Internet in order to browse web pages and access other online content. Some current cellular telephones have a client, which enables the phone to form a connection with an Internet server. After the connection is established, the phone may request information, such as a web page for viewing, from the server. The server may then respond by transmitting the web page for viewing on the cellular telephone's display.

In other systems, cellular telephones may have search clients that communicate with remote search engines implemented at Internet servers. Users may enter search terms and select a type of search to transmit to the search engine. For example, the user may enter the search term "dog" and specify the search type as "images." This information then may be transmitted to the search engine, which may generate results related to the search request and transmit the results to the cellular telephone. The cellular telephone could then display the search results, such as thumbnail images of dogs.

Wireless devices, including cellular telephones, may use the wireless application protocol (WAP) for accessing the Internet. The WAP is a specification that defines how the devices communicate with Internet systems. A WAP browser client may support languages such as HTML and XML to enable the display of digital content on a wireless device. However, using the WAP interface to establishing a connection between an Internet server and the browser may take several seconds.

For example, a browser on a cellular telephone may display a search page, which is employed by a user to enter search terms. After entering a search term and initiating a search, such as a search for images, a user may have to wait 6-8 seconds for the browser to establish a connection with the remote search engine, which begins to transmit the results to the phone. After all the results have been transmitted, the browser may display them to the user. If the user desires to view results of a different search type, such as web page URLs (uniform resource locators), the user may have to wait another 6-8 seconds for the browser to establish the connection for sending an additional search request and downloading additional results. In addition to such "latency" delay in forming a connection, delay may occur because wireless connections are relatively slow compared to fixed connections.

Other systems may use Short Message Service (SMS) to communicate with systems networked through the Internet. SMS enables a wireless device, such as a cellular telephone, to send queries as text messages. Connection time between the wireless device and the Internet systems may be less than what is required for WAP; however, the results returned are in plain text with no URLs, no web pages, and no images.

SUMMARY

In general, this document discusses systems and methods for providing information in overloaded connections that have information that would ordinarily be transmitted in multiple connections. In this way, fewer connections may be made and less latency introduced to a system.

In one implementation, a method of providing information responsive to a request from a wireless communication device is disclosed. The method comprises receiving an information request from a mobile device and generating responsive information for the information request, transmitting a first portion of the responsive information to the mobile device in a first communication session, and transmitting a second portion of the responsive information to the mobile device in a second, overloaded communication session. The overloaded communication session may comprise a hypertext transfer protocol (HTTP) communication session, or a socket communication session, among many others. The information request may comprise a search request.

In some implementations, the responsive information in the first communication session may comprise information in a first search result type, and the responsive information in the second, overloaded communication session may comprise information in a plurality of search result types that differ from the first search result type. Also, the first communication session may occur before the second communication session, and it may be an overloaded communication session.

In another implementation, a method of transmitting requests and receiving information responses using a mobile communication device is disclosed. The method comprises overloading a connection between the mobile communication device and a server, wherein the overloading includes transmitting a search request from the mobile communication device to the server, receiving at the mobile communication device from the server a first set of results associated with the search request, and receiving at the mobile communication device from the server a second set of results in an overloaded communication session associated with the search request. The receiving may be carried out by a non-browser application. In addition, at least a portion of the first set of results may be displayed before the second set of results has been fully received. Also, a selection of a result element may be received in response to display of the first set of results or the second set of results, and a telephone connection generated in response to the selection.

In one implementation, a selection of a result element may be received in response to display of the first set of results or the second set of results, and transmitting a text message in response to the selection. Also, a selection of a result element may be received in response to display of the first set of results or the second set of results, and a web page request in response to the selection. The receiving of the first set of results and receiving the second set of results may also be performed by separate execution threads on the mobile communication device.

In other implementations, the first set of results and the second set of results may relate to multiple different search types. The multiple search types may be selected from a group consisting of advertisements, images, web pages, maps, news, geographically specified (local) content, shopping, weather, and content resident on the mobile device. Also, the multiple search types may be displayed as display elements categorized by search type, and each category may be displayed separately. One search type may also be displayed with another search type. In addition, navigation between the multiple search types may include horizontal navigation. Search requests for the multiple different search types may also be generated in response to entry by a user through one entry point in a user interface.

In yet another implementation, a computer program product containing executable instructions that when executed cause a processor to perform certain operations is disclosed. Those operations include overloading a connection between a mobile device and a server, wherein the overloading comprises transmitting a search request from the mobile device to the server, receiving at the mobile device from the server a first set of results associated with the search request, and receiving at the mobile device from the server a second set of results associated with the search request.

In another implementation, a system for transmitting requests and receiving responses using a wireless device comprises a connection module that establishes a connection between a mobile device and a server, a query module that transmits a search request from the mobile device to the server, and a means for separately receiving at the mobile device from the server a first and second set of results, wherein both results are associated with the search request.

A system for transmitting requests and receiving responses using a wireless communication device is also disclosed. The system comprises connection module that establishes a connection between a mobile device and a server, a query module that transmits a search request from the mobile device to the a server, a result download module at the mobile device that receives from the server a first portion of results associated with the search request after a first time period and receives a second portion of results associated with the search request after a second time period, and a display module at the mobile device that provides the first portion of results for display after the first time period and appends the second portion of results to the first portion of results for display after the second time period.

Advantages of the systems and techniques described herein may include any or all of the following: decreasing the wait time required for a user to view search results; decreasing connection overhead when navigating through results of different search types; improving navigation between search results; providing a more efficient method for a user to enter a search request that returns multiple search types; providing result selection that generates a phone call; and providing result selection that generates a text message.

The details of one or more implementations are set forth in the accompanying drawings and the description below. Other features, objects, and advantages of the implementations will be apparent from the description and drawings, and from the claims.

DESCRIPTION OF DRAWINGS

FIG. 4 is a block diagram with further details of the system shown in FIG. 1a;

FIGS. 5a-c are diagrams of an exemplary user interface (UI) that may be generated by the mobile device shown in FIG. 1a; and FIGS. 6a-c are flow charts of methods for selecting a search element and performing a related action, each according to one implementation.

Like reference symbols in the various drawings indicate like elements.

DETAILED DESCRIPTION

Figure 1A:
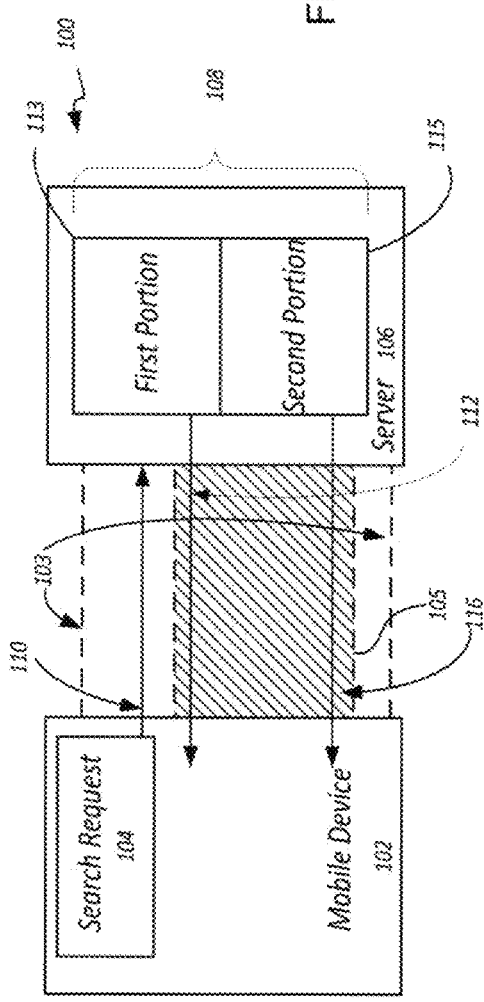
FIG. 1a is an exemplary conceptual diagram showing the establishment of communication connections.

FIG. 1a is an exemplary conceptual diagram showing the establishment of communication connections. In the implementation of FIG. 1a, a system 100 is shown by which a mobile device 102, such as a cellular telephone, may establish a connection 103 with a server 106 to send a search request 104. The server 106 may respond by transmitting information 108 associated with the search request 104, such as search results, to the mobile device 102. The search request 104 may be a request for digital information, such as web pages, maps, and images associated with the search terms. The server 106 may be a networked computing device, such as an Internet server that implements a search engine.

In response to the search request 104, the server 106 may transmit the responsive information 108 to the mobile device 102 using a set 105 of overloaded connections, which permits the server to send the information in fewer than normal transmissions. After the server 106 receives the search request 104 in a first transmission indicated by an arrow 110, the server may send a first portion 113 of the responsive information 108 to the mobile device 102 in a first overloaded communication, as shown by an arrow 112. The server 106 may then transmit a second portion 115 of the responsive information 108 as part of a second overloaded communication, as shown by arrow 116.

The connections are "overloaded" because they carry more data than would naturally be carried in a single connection. For example, where the responsive information 108 contains results to a search request, the results for web search, image search, and local search may be sent via a single connection, where only the results for the immediately-selected search type would normally be downloaded. Alternatively, certain portions of each type of search may be returned from a first connection so that the material most-needed by a user is delivered first. For example, where the information transaction involves a search request, the first page of results for certain of the search styles (e.g., web and news) may be delivered in a first overloaded connection, while the first page of results (and perhaps other pages of the initially-transmitted results) for other search styles (e.g., images) may be delivered in a second or other subsequent connections.

The particular material to be delivered in the first overloaded connection may differ depending on the implementation, and may also be specified by a user. For example, a user may prefer not to receive image data in a first overloaded connection because such data might unnecessarily delay the first display of a search result or increase costs to the user. A user might also prefer to see "local" style responses first, because the person is presumably looking more for local content when using a mobile device.

Sending the responsive information 108 in more than one transmission may decrease the time a user has to wait before viewing the information 108, i.e., the "time to first impression." For example, a user may use a client on a cellular telephone to submit a search request for "donuts." The client may establish a connection with an Internet server 106 and transmit a search request to a search engine implemented at that server 106. The search engine may then generate search results and send the first portion 113 of those results to the cellular telephone, which may display the results to the user. While the user is viewing the first portion 113 of search results, the search engine may send a second portion 115 of search results to the cellular telephone.

The coordination of various transmissions may be configured as appropriate to meet the needs of a particular application. For example, a first transmission may not be overloaded or may be minimally overloaded so that the time-to-first-impression is short. Such an approach may be appropriate where the user needs results quickly, and can be expected to review the results relatively slowly (so that the subsequent overloaded connections can complete before the user needs information from them).

Also, more than two connections can be made, and the number of connections can vary from time to time or download to download. For example, the amount of information to be included in a first connection may depend on a user's past viewing patterns, e.g., if the user is constantly trying to access follow-up information before it is downloaded, the first connection can be more fully overloaded in the future. Likewise, the server 106 may determine the total amount of information, and divide the load into the appropriate number of connections, such as based on a predetermined rule set. As one example, a particular connection size may be established for the first, second, and subsequent connections (e.g., with each subsequent connection involving a larger transmission), and the server 106 may package the information for each connection so as to approximate the various connection sizes. Thus, connections may be divided-up in a manner that allows for substantially predetermined download times, and times to impression, for various parts of the delivered results.

Information transmission may also be triggered by an event other than an explicit user request (e.g., a search term submission). For example, information transmission may be triggered by passing of time (e.g., a download at a particular time each day, such as for news, traffic, or weather information) or by locational changes by the mobile device (e.g., GPS-detected movement can trigger a transmission of traffic information).

Figure 1B:
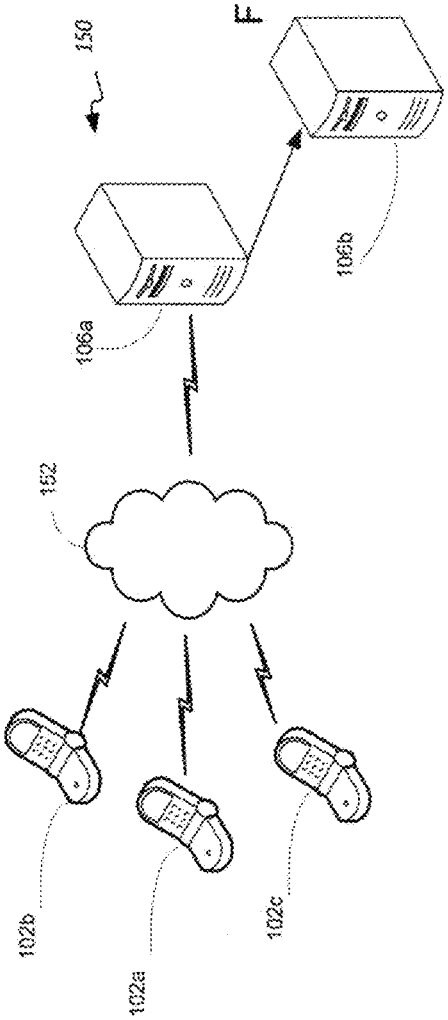
FIG. 1b is an exemplary diagram of a system for sending transmissions and receiving responses using and overloaded connection.

FIG. 1b is an exemplary diagram of a system 150 for sending transmissions and receiving responses using an overloaded connection. The system 150 may be used to implement the system 100 shown in FIG. 1a. A number of mobile devices in the form of cellular telephones 102a-102c are shown for use by users of the system 150. Other appropriate mobile devices, such as PDAs, laptop computers, or other communication devices may also be used. Cellular telephone 102a may establish a connection 103 with the Internet server 106a using software, such as a search client that is installed on the cellular telephone 102a. The cellular telephone 102a may be communicatively connected to a network, such as the Internet 152, and may thereby communicate with other devices such as the server 106a. The cellular telephone 102a may connect directly or indirectly to the Internet 152. For example, the cellular telephone 102a may connect to a cellular telephone network (not shown) that is, in turn, connected to the Internet 152. Additionally, it may use technology such as Voice Over IP (VoIP). The communication flow for the cellular telephones 102a-102c may be bidirectional so that the server 106a may receive information, such as commands, from the cellular telephones 102a-102c, and may also send information to the phone. More than one phone, such as phones 102b and 102c, may communicate with the server 106a simultaneously or serially.

Additionally, cellular telephones 102a-102c may communicate with more than one server. The phones 102a-102c may choose or be assigned a server to communicate with based on the bandwidth available to that server. For example, the phones 102a-102b may send the server 106a a packet of information to determine its response time. The server 106a may return a response and, based on the time it takes to return the response, the phones 102a-102c may determine whether or not to send a query to that server 106a or to attempt to send the query to another server, such as 106b. Alternatively, the server 106a may send information including its status and the status of other servers. For example, the server 106a may respond that it is too busy to handle the request, but may transmit information identifying server 106b that may handle the request. The particular phone could then contact the identified server 106b. In other embodiments, the server 106a may directly pass the request to the server 106b if it is too busy to handle the request.

The user may enter the search terms in a textual or other format through the use of keys, buttons, a stylus, or any other appropriate features or collection of features. For example, if the mobile device is a cellular telephone, the user may enter the text by pressing telephone keys that correspond to letters. Entry schemes, such as predictive text entry and triple-tap entry may be used. In predictive text entry, a user enters one or more letters, and an application attempts to complete the words (and perhaps to clear up ambiguity in what letters were intended when a user pressed a numeric key) being entered based on previous entries or a local dictionary that contains common words. Triple-tap entry may require a user to press one or more telephone keys multiple times before the desired letter is selected from multiple letters associated with that phone key. The user may then continue to enter letters until the complete word has been spelled.

The search results may be output in various manners. The output may be displayed on the cellular telephone's screen as text. Alternatively, the output may be audible, such as speech played from a speaker in the cellular telephone. In other implementations, the output may include video that is displayed on the cellular telephone's or other device's screen.

Referring to FIG. 1a, in one implementation, the first portion 113 may be a first type or style of search result, such as images (or a group of multiple types or styles). The second portion 115 may be a second type of search results, such as web page URL's, or links Each portion may be an overloaded transmission, so that, for example, the first portion 113 may include both web results and local results. The second portion 115 may then include image results, news results, and groups results. In addition, desktop results may additionally be identified and retrieved from the device itself, such as from e-mails and other files stored in the device. Thus, the desktop results may be retrieved at any appropriate point, such as immediately after a search is executed, and while the first portion 113 is being delivered.

The user may view the initially transmitted information, such as images, while links to the web pages are transmitted to the cellular telephone by the search engine. When the user finishes viewing the images, the user may then view the links, which have been downloading in the background and will be ready for display once the user has reviewed the initially-downloaded information. Alternatively, other pages of images may be downloading in a second string while the user views the first page or pages of images. The user may be unaware of the overloaded transmissions and the separate transmission of the search results. Additionally, any overhead time associated with establishing a connection to receive different types of search results may be decreased by overloading the connection.

In another implementation, the client may download a first amount of a particular type of search results as the first portion 113 and a second amount of the same type of search results as the second portion 115. For example, the search engine may transmit 10 web page links. While the user is viewing the first 10 web page links, the search engine may transmit a second 10 web page links. The user may be unaware of the separate transmissions of the web page links. Instead, it may appear to the user as if the entire 20 web page links have been downloaded simultaneously. Where overloaded connections are employed, the mobile device 102 may download multiple different types of information in each connection, such as by first downloading the ten best web results and the ten best news results in the first connection.

Figure 2:
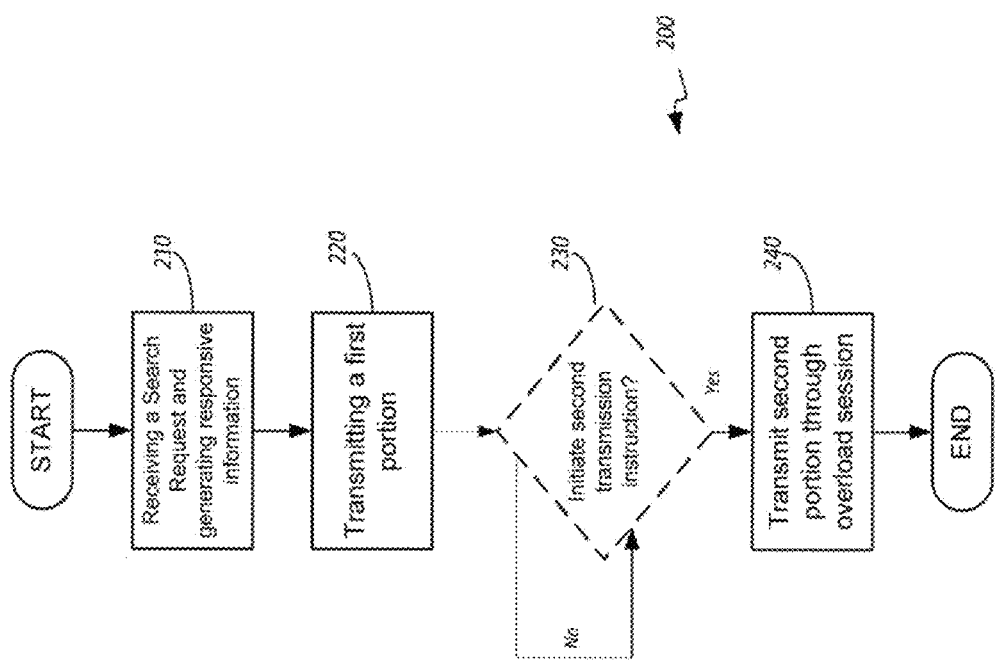
FIG. 2 is a flow chart of a method for receiving search requests and transmitting responsive information by a server according to one implementation.

FIG. 2 is a flow chart of a method 200 for receiving search requests and transmitting responsive information by a server. The server may be similar to the server 106a or 106b shown in FIG. 1a. For example, a computer program product such as a machine-readable medium may include instructions that cause a processor of the server 106 to perform operations comprising the stages of method 200.

At stage 210, a search request is received and responsive information, such as a search result, is generated. For example, a client on a mobile device may transmit a search request including search terms to a server. A search engine implemented at the server may then generate search results based on the search request. Other requests may also be received from the client, and related information transmitted to the client.

At stage 220, a first portion of the responsive information is transmitted to the mobile device in a first communication session. For example, the server may transmit a first portion of the search results to the cellular telephone for displaying. The first portion may include a first type of results, such as links to web pages. The first portion may also be transmitted in an overloaded connection, such as a connection that transmits web, news, and local results, or a connection that transmits web results along with some or all of the content from those results. For example, where one of the search results is the CNN home page, the additional information in the overloaded connection could include the text from the CNN home page, so that a user can see certain information immediately if they click on the "CNN" link from their search results.

An operation "initiate second transmission instruction?" is performed at stage 230. The server may receive an instruction from the mobile device to initiate transmission of the second portion. For example, the server may receive an instruction to begin transmitting the second portion of the search results. This may be received after transmission of the first portion. The server may also simply begin sending the second portion once it has finished sending the first portion. A new connection may be made for the second portion, particularly where completion of the first connection is necessary to make the information transmitted in the first connection usable in part or in full by the mobile device.

Alternatively, the instruction may be received before the transmission of the first portion is complete. If such an instruction is received, stage 240 may be executed. Otherwise, the method may continue to execute stage 230 until the instruction is received.

An instruction to execute the second transmission may be received from the mobile device, for example, where the user has reviewed the initially-transmitted information and has selected to review additional information. For example, where the first transmission transmitted web and image data, and a user selects a tab to review news data, that selection can cause the second transmission to occur, including by causing any other ongoing transmission to end (or be interrupted temporarily), if appropriate. If the second transmission includes the information the user has now requested, the connection for that transmission may end as soon as the newly requested information has been downloaded.

Any information not delivered from a connection that has been interrupted before its completed may be transmitted in any other appropriate manner. For example, the remaining information may be included at the beginning of the next connection, at the end of the next connection, or as part of another connection (such as at the end of the last connection). Also, connections that have not yet been made can be completed when other connections have been completed.

An instruction to execute the second transmission may also be generated by a server itself. For example, if a mobile device does not transmit any information during the transmission for a first connection, the server may begin transmitting information for the second connection immediately.

An operation "transmitting the second portion" is performed in a stage 240. As noted, a second portion of the responsive information is transmitted to the mobile device after the first communication session. For example, while the user of the cellular telephone is viewing the previously transmitted search results that included the links to web pages, the server may transmit a second type of search results to the cellular telephone, such as links to images. The user may then view the links to images without having to initiate a new connection to the search engine implemented at the server. The same connection may be used as an overloaded connection for sending both the Web links and the image results. When all information has been transmitted, the process may end.

In FIG. 2, the first portion is shown as simply transmitted while the second portion is shown as being transmitted by an overloaded session. It is also possible for the first transmission to be overloaded and the second not overloaded, or for both or neither to be overloaded. In addition, more than two transmissions may occur when appropriate, particularly where transmissions are interrupted (e.g., by a user selecting an already-transmitted item) and need to be picked up again. Whether a particular transmission is overloaded, and the extent to which it is overloaded (e.g., whether two normal transmissions are combined into one or three or more are combined into one) will depend on the particular needs of an application and the capabilities of a system. For example, it may be preferable not to overload a first connection by too much or else the "time to first impression" may be impacted negatively. The degree to which each connection is overloaded or not overloaded can also be adjusted dynamically, such as by observing whether a particular user repeatedly moves quickly from one search type to another. If such behavior is observed, those types may be made part of a single first overloaded connection, for example.

Figure 3:
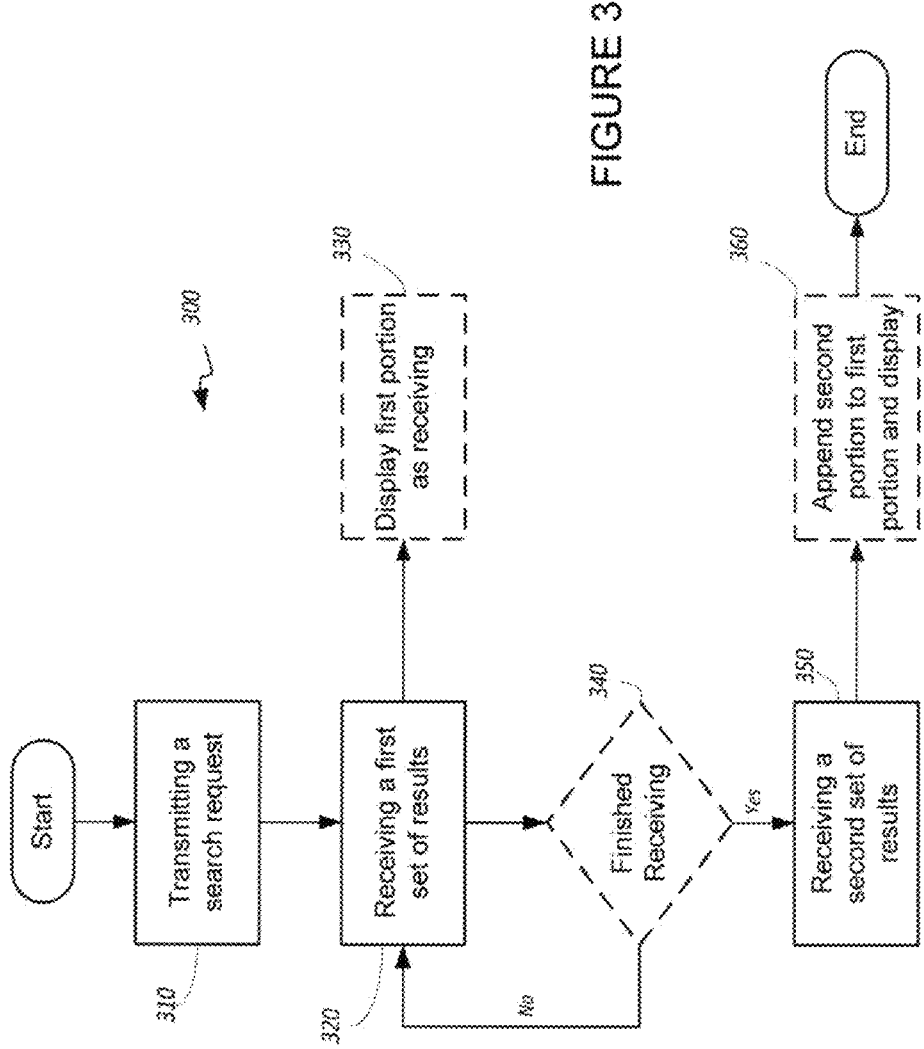
FIG. 3 is a flow chart of a method for overloading a connection by a mobile device according to one implementation.

FIG. 3 is a flow chart of a method 300 for overloading a connection by a mobile device. In general, this flow chart shows operations occurring at a mobile client device. The mobile device may be similar to the mobile device 102 shown in FIG. 1a. For example, a computer program product such as a machine-readable medium may include instructions that cause a processor of the mobile device 102 to perform operations comprising the stages of method 300.

An operation "transmitting a search request" is performed in a stage 310, at which a search request is transmitted from a mobile device to a server. For example, the user may enter search terms in a search client installed on a cellular telephone. The cellular telephone may transmit a search request including the search terms to a search engine implemented at a server.

An operation "receiving a first set of results" is performed in a stage 320. The mobile device receives from the server a first set of results associated with the search request. For example, a cellular telephone may receive titles and hyperlinks to web pages related to the search terms entered by the user. The titles and hyperlinks may be generated by a search engine implemented at the server and may be part of a larger number of titles and hyperlinks generated in response to the search request.

An operation "display the first portion as received" is performed in a stage 330. The first portion may be displayed as it is received by the mobile device. For example, the first title and hyperlink may be displayed as the remaining nine titles and links are being downloaded by the cellular telephone. Also, the display may not, in appropriate circumstances, occur until a certain part of the transmissions has been received or all of the transmission has been received.

An operation "finished receiving" is performed in stage 340. If the mobile device has completed receiving the first portion of the responsive information, it may initiate a transmission to the server indicating the mobile device can accept a second portion of the responsive information. Otherwise, the device continues to receive the first portion of the responsive information. For example, a search client installed on the cellular telephone may determine whether the first set of titles and hyperlinks have downloaded. If they are downloaded, the search client may transmit information to the server 106 indicating that the second portion of web links may be transmitted to the cellular telephone. However, if the search client determines that they have not completely downloaded, it may continue the download.

An operation "receiving a second set of results" is performed in a stage 350. The mobile device receives from the server a second set of results associated with the search request. For example, if the responsive information generated from the search request includes two sets of titles and hyperlinks and the server has previously transmitted the first set, the server may transmit the additional second set in a second overloaded communication session (including by transmitting the second set of web results, a second set of images results, and a second set of local results).

An operation "append second portion to first portion and display" is performed in stage 360. After the second portion of responsive information is received by the client, the second portion may be appended to the first portion and displayed. For example, the client in the mobile device may append the second set of titles and hyperlinks to the first set and refresh the cellular telephone display, or may otherwise display any requested information that has been downloaded immediately. A refreshed screen may show both sets of hyperlinks and titles. The two sets may not be visible at the same time, but may be accessed through user interface components, such as a scroll bar, a drop down list, a selected a tabbed panel, or any combination thereof.

Figure 4:
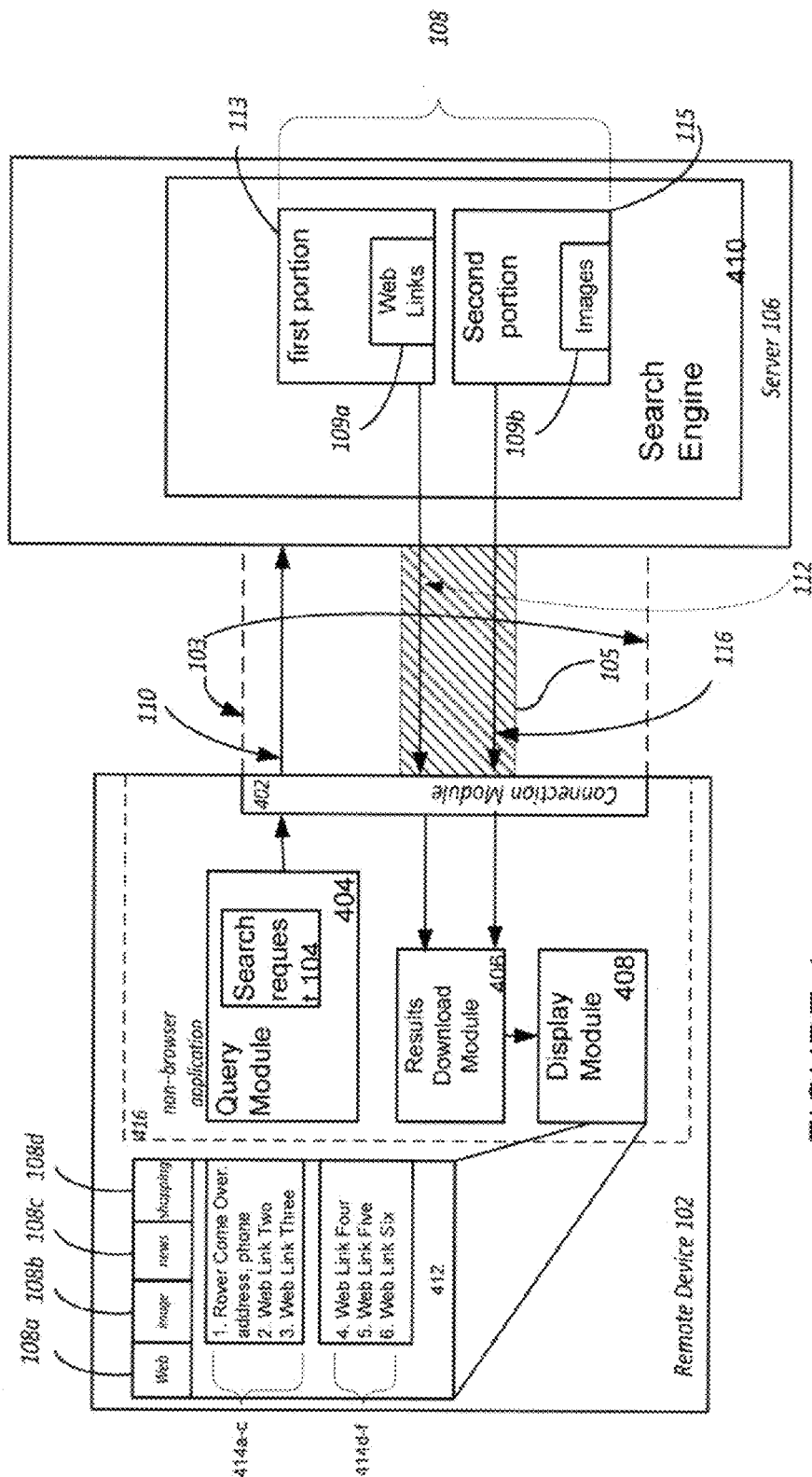

FIG. 4 is a block diagram with further details of the system 100 shown in FIG. 1a. The mobile device 102 and the server 106 may establish a connection 103 for transmission and receipt of a search request and information responsive to the search request 104. The mobile device may be a mobile device, such as the cellular telephone shown in FIG. 1b, and the server may be an Internet server that hosts a search engine, such as the server 106 also shown in FIG. 1b. The cellular telephone may include search client software installed on the cellular telephone to execute methods, such as the methods shown in FIGS. 2 and 3. The software may include a connection module 402, a query module 404, a result download module 406, and a display module 408.

The query module 404 may accept user input, such as search terms, geographical information, and demographic information, from a user interface or other components. The connection module 402 may initiate a point of contact with the server 106 to establish the connection 103 between the mobile device 102 and the server 106. The query module 404 may transmit a search request 104 to the connection module 402, which may transmit the request 104 to the server 106. The result download module 406, which receives search results from the server 106, and the display module 408, which displays those results, will be discussed in greater detail below.

In one implementation, the search request 104 and the transmission of the search results 108 may use a hypertext transfer protocol (http) connection to exchange information. For example, the request may be in the form of a POST command, which may cause the server to respond by sending the search results in HTML (Hypertext Markup Language) or XML (Extensible Markup Language) format.

In another implementation, a socket connection may be used to exchange the search request 104 and the corresponding search results 108. Use of the socket connection may permit a user to see the search results as they are received by the mobile device 102 instead of requiring the user to wait for the entire download of the first portion 113 of results to complete before the mobile device displays them. Additionally, users may be able to interrupt the connection if they choose to cancel a search. Any other appropriate type of data connection may also be used.

The server 106 may include a search engine 410, which can use the search request 104 to generate the search results, or response information 108, which may include different search types 109, such as advertisements, images, web pages, maps, news, entertainment content, geographically specified (local) content, shopping content, weather information, and URL's to any of the previously mentioned items. Entertainment information may include results, such as movie times, ball game times, local clubs, and bands scheduled to perform in the user's locality. Shopping content may include results such as product prices, a listing of stores that carry a particular product, product reviews, and items that may be ordered online. Geographically specified content may include results, such as contact information for local businesses that sell products or services related to the search request.

After receiving the search request 104, the server 106 may pass it to the search engine 410 to generate the search results 108. The search results 108 may include the first portion 113 and the second portion 115, as discussed above. In one implementation, the first portion 113 may be results of a first search type and the second portion 115 may be results of a second search type, or each portion may include results for multiple different search types. For example, as shown in FIG. 4, the first portion 113 may include results from the search type "web page links" 109*a*, and the second portion 115 may include results from the search type "images" 109*b*. The first portion 113 may also includes results from multiple search types, while the second portion may also include results from multiple search types.

In a second implementation (not shown in FIG. 4), the first portion 113 may include a first amount of one search type, and a second portion 115 may include a second amount of the same search type. For example, the first portion 113 may include a first set of URL's for images, and the second portion 115 may include a second set of URL's for images. Additionally, the first portion 113 may contain results ranked as more relevant than the results included in the second portion 115. For example, the server 106 may determine that one set of links is more relevant to the search request than another set of links. The server may then include the more relevant set of links in the first portion 113 and the less relevant set of links in the second portion 115 (including with a first set of links for multiple different search types in one or both portions). The user may be able to view the more relevant set of links first.

After generating or partially generating the search results 108 in response to the search request transmitted from the mobile device 102, the server 106 may transmit the first portion 113 to the mobile device, as shown by the arrow 110. The mobile device 102 may receive the first portion 113 at the result download module 406 using the connection module 402, which communicates with the server 106, to receive the first portion 113.

The first portion 113 may be sent to the display module 408 for display as part of the mobile device's user interface 412 (UI). The UI may include several tabbed panels. For example, as shown in FIG. 4, there may be a tabbed panel for web search results 108*a*, a tabbed panel for image results 108*b*, a tabbed panel for news results 108*c*, and a tabbed panel for shopping results 108*d*. Although not shown, other tabbed panels may be accessible for search types previously described and other appropriate search types.

Each tabbed panel may contain several result elements 414*a*-414*n*. For example, a result element 414*a* may include a title and URL of a website for a dog kennel called "Rover Come Over" and a brief description (a "snippet") of the content of the website. The result element may also contain geographical and contact information. For example, the location and phone number of the kennel may be included in the result element.

While a user is viewing the result elements 414*a*-414*n* on the UI 412, the server 106 may transmit a second portion 115 of the search results 108 to the download module 406, which may, in turn, transmit them to the display module 408. The display module 408 may append the second portion 115 to the first portion 113 of the search results and refresh the UI display so that both portions are visible to a user.

In one implementation, the download of the first and second portions 113, 115 may be initiated by the result download module 406. Additionally, the downloads may be executed as separate threads, which permits them to operate simultaneous with each other and with other operations. For example, the download module 406 may include a process that initiates a download thread that passes a search request to the server 106 and receives the first portion 113. When the first download thread completes, the first portion 113 may be passed to the display module 408 and a second thread may be initiated to download the second portion 115. This thread may run as a background process simultaneous with other operations, such as scrolling through the first portion 113 of results and selection of one of the result elements. When the second download thread is complete, the result download module 406 may transmit the second portion 115 of results to the display module 408 for display with the first portion of results.

In another implementation, an execution of the download threads for portions 113, 115 may overlap. For example, the second download thread may be initiated simultaneously with the first download thread or before the completion of the first thread. This may occur when the server 106 or a client on the mobile device 102 determines there is enough bandwidth to send both portions simultaneously. In other implementations, the second download thread may be staggered with the first download thread to increase efficiency by eliminating or mitigating any gaps between the download of the first portion 113 and of the second portion 115. Overlapping threads may also be used when the first thread is interrupted before it is complete, such as by a request that starts the second thread. The first thread may be completed after the second thread is complete or at another appropriate point (e.g., if the user seeks information from the end of the first thread before the second thread is complete).

In another embodiment, more than two threads may be used in the overloaded connection 103. For example, three threads may be used; one that downloads web link search types, one that downloads image search types, and one that downloads advertisements. Additionally, more than two threads may be used to download the same type of results. For example, the first thread may download ten images that the server 106 determines to be the most relevant to the search request. The second thread may download another ten images determined to be the second most relevant to the search request, and the third thread may download ten more images that may be less relevant than either the first or second set of images.

The addition of the second portion 115 of search results may not be apparent to a user because a part or all of the first portion 113 of search results may fill the user interface. To view the additional results 115, the user may have to use a scroll bar or select a different tabbed panel. For example, the first portion 113 may include web page links and the second portion 115 may include images. A user could view the first portion on the "web" tabbed panel 108*a* and could switch to the "image" tabbed pane 108*b* to view the second portion 115. The first portion 113 may alternatively be a first set of search results for multiple search types (e.g., web, news, and local) while the second portion 115 may be a first set of search results for other search types (e.g., images, shopping, blogs, etc.).

In another implementation, as shown in FIG. 4, The first portion 113 could be results 414*a-c*, and the second portion 115 may be the results 414*d-f*. The results 414*a-c* could fill the display area of the "web" tabbed panel 108*a*. To view the results 414*d-f*, the user would use the scroll bar 420 to scroll down to those results.

In one implementation, the query module 104, the result download module 406, the display module 408, and the connection module 402 may be components of a non-browser application 416 installed on the mobile device 102.

The application 416 may interface with a browser (not shown) that is also installed on the mobile device 102 through an application program interface (API). The application 416 may display a result, such as a web page URL, and permit a user to select it. The application may then pass the selection information to the browser using the API, and the browser may request and display the web page on the mobile device 102. The application may also include components to allow the display of web-based documents and basic navigation through those documents (e.g., forward and backward buttons, and selection of hyperlinks). The display may be complete or limited, e.g., the display of a stripped-down version of the web-based documents (e.g., removal of images or replacement of images with text URL's). As such, the application can provide for basic functionality without the overhead of a full browser, and may then hand over control to a browser if more advanced features are needed. In another implementation, a full browser may be implemented in the same client that includes the query, the result download, display, and connection modules.

FIGS. 5a-5c are diagrams of an exemplary user interface (UI) that may be generated by the mobile device 102 shown in FIG. 1a. FIG. 5a shows a UI, such as the UI 412 shown in FIG. 4, which contains text box 502 for entering search terms used in the search request 104. The UI 412 may also include additional text entry boxes for geographical information, such as text box 504. Information including a user's street, city, state, and zip code may be entered in the text box 504 and included in the search request 104.

In some implementations a user may only need to enter this information once. After that, the information may be stored on the mobile device or at the server 106. Alternatively, a user may not need to enter the information at all if the mobile device has GPS capabilities. In this case, the mobile device may generate the geographical information to send with the search request. A search button 506 may initiate transmission of the search request to the server. To select the search button, a user may manipulate buttons on the mobile device, such as the cellular telephone's keys.

The user may enter the search terms in one entry point and receive multiple search types. For example, a user may enter the term "donut" in the text box 502. After receiving the search request, the server may generate and transmit search types, such as images of donuts visible in the "image" tab panel, links to local donut shops visible in the "local" tab panel, and driving directions to the donut shops closest to the user's location visible in the "maps" tab panel.

Additionally, an image or images may be displayed in the area 508 of the UI 412. The images may be stored in local memory, and may include advertisements associated with previously returned search results. In another implementation, the image may include an identifier, such as the software manufacturer of the installed application or the name of the user. After the search is initiated, and while it is being processed, a status image 518 may be displayed as shown in FIG. 5b. The status image 518 may also be stored in local memory, and may change as results are delivered so as to provide a user with an indication of the progress of the information delivery.

FIG. 5c is a diagram of an exemplary UI after the mobile device 102 receives the search results 108. In the depicted implementation, the result elements 510a-c may be displayed in a result area 512. Additionally, area 516a may display the type of results returned, with each type accessible by selecting the desired tab of a tabbed panel. Area 516b may include the search terms entered and area 516c may contain advertising or other promotional material related to the search results. The advertising search type shown in the area 516c may be visible regardless of which tabbed panel is selected for viewing. A separate tabbed panel may also be provided for promotional material such as advertisements and other similar material.

A user may manipulate buttons (not shown) on the mobile device to employ a scroll bar 514 to scroll through the result elements. Additionally, the user may manipulate a button to move though the result elements one element at a time. To navigate between search types, a user may manipulate the same or a different button to select a different tab. Selection of a different tab may replace the currently displayed result elements of one type with result elements of another type. For example, if the current tabbed panel shows web page links and a user pushes a cellular telephone key that selects the image tab, result elements associated with the image panel may be displayed. Switching between search types may be accomplished through the horizontal navigation performed by the user in the tab selection.

In one implementation, the search elements 510a-c displayed in the area 512 may have several properties and initiate different actions when selected. FIGS. 6a-c are flow charts of methods 600, 630, and 660 for selecting a search element and performing a related action, each according to one implementation. For example, a computer program product may include instructions that cause a processor to perform operations comprising the stages of method 600. As shown in FIG. 6a, the method 600 includes the following stages.

An operation "displaying result element with phone number" is performed in a stage 602. A result element is displayed, wherein the result element includes a phone number property. For example, the mobile device may receive the result element 510a (shown in FIG. 5c) for a store named "Donuts 'R Us." The element 510a may have a phone number as a property, which may be displayed along with the result in the result area 512, or which may be associated with a hyperlink or other selection element under the displayed title.

An operation "receiving a selection of the result element" is performed in a stage 604. A selection of a result element is received from the user in this stage. For example, the user may manipulate buttons on the cellular telephone to highlight and select the "Donuts 'R Us" element 510a. Alternatively, the user may be able to highlight the result and then select among several properties of the result. For example, the "Donuts 'R Us" element 510a may have several phone numbers associated with it, such as a number for the cinnamon twist baker and a number for the Long John baker. A user could select the number for the baker with which the user desires to speak.

An operation "generating a telephone connection" is performed in a stage 606. A telephone connection is generated in response to the selection. For example, when a user selects the cinnamon twist baker's phone number, the property may be passed to an external application or an internal module that generates a telephone call to that phone number. In one implementation, after the phone call is complete, the user may return to the result area 512 and select additional properties as shown by an arrow 608.

Similarly, the methods 630 and 660 may be implemented as shown in FIGS. 6b and 6c. For example, a computer program product may include instructions that cause a processor to perform operations comprising the stages of method 630 and method 660. As shown in FIG. 6b, the method 630 includes the following stages.

An operation "displaying result element with URL" is performed in stage 632. A result element is displayed, wherein the result element includes a URL. This stage may be similar to stage 602 of FIG. 6a, but the property displayed with the result element may be a URL of a web page. For example, the search result 510b for a web page titled "Go Nuts for Donuts!" has a URL as a property.

An operation "receiving a selection of the result element" is performed in stage 634. This may be similar to the stage of 604, but the property selected may be a URL.

An operation "requesting a web page" is performed in stage 636. The web page may be requested in response to the user's selection. For example, when a user selects the search result 510b, the URL may be passed to a browser program or module that may request the associated web page from a remote server and display it.

FIG. 6c shows a method 660 for selecting a result element for sending a SMS (short message service) message according to one implementation. The method 660 includes the following stages;

An operation "displaying result element with SMS address" is performed in stage 662. This stage may be similar to stages 602 and 632, but a result element is displayed, where the result element includes a SMS address. For example, the search result 510c has a SMS address for the "Donut Man" and prods the user to IM (Instant Message) this individual.

An operation "receiving a selection of the result element" is performed in stage 664. This stage may also be similar to the stage of 604 and 634, but the property selected may be a SMS address.

An operation "sending text message" is performed in stage 666. For example, when a user selects the SMS address associated with the Donut man, the address may be passed to a text messaging program or module. The user may be presented with a text area to input a message. After entering the message, it may be transmitted to the individual identified by the SMS address.

In one implementation of methods 630 and 660, the user may return to the result area 512 and select additional properties after the web page is viewed or the text message is sent as shown by arrows 638 and 668, respectively.

In other implementations not shown in FIGS. 6a-c, a result element may have more than one property. For example, an element may have a URL and a phone number. The user may select either of the properties to perform the actions previously described. Additionally, other result elements may have properties such as e-mail addresses, fax numbers, links to executable programs, and links to digital files.

A number of implementations have been described. Nevertheless, it will be understood that various modifications may be made without departing from the spirit and scope of this application. For example, optional stages 330 and 340 of FIG. 3, which describe displaying the result elements as they are downloaded and initiating a second download of the additional search results 108, respectively, may be removed. Other steps in the described processes may also be eliminated or combined as appropriate, or performed sequentially or simultaneously, and additional steps may be added. Additionally, the transmission of the first portion 113 and second portion 115 may be simultaneous, partially overlapping, or sequential. Accordingly, other implementations are within the scope of the following claims.

What is claimed is:

1. A computer-implemented method comprising:
   receiving, by a computing device, a data request for a first type of data that is responsive to a data request;
   identifying, by the computing device, data that is responsive to the data request;
   identifying at least a first portion of the data that is of the first type of data and a second portion of the data that is of a second type of data;
   transmitting, by the computing device during a first communication session at a first time, the first portion of the data to a mobile device for display on the mobile device; and
   transmitting, by the computing device and during a second communication session at a second time after the first time and while the first portion of the data is being displayed on the mobile device, the second portion of the data to the mobile device for display on the mobile device.

2. The method of claim 1, wherein the second communication session comprises a hypertext transfer protocol (HTTP) communication session.

3. The method of claim 1, wherein the second communication session comprises a socket communication session.

4. The method of claim 1, wherein the data request comprises a search request.

5. The method of claim 4, wherein the first portion of the data that is transmitted during the first communication session comprises information in a first search result type, and the second portion of the data that is transmitted during the second communication session comprises information in a second search result type that differs from the first search result type.

6. The method of claim 5, further comprising receiving, from the mobile device, an instruction to execute transmission of the second portion of the data after the first portion of the data has been fully transmitted,
   wherein transmitting the second portion of data is performed in response to receiving the instruction to execute transmission of the second portion of data,
   wherein the mobile device provides the instruction to execute transmission of the second portion of data for receipt by the computing device in response to user input that selects to view the information in the second search result type while the mobile device is displaying the first portion of data that comprises information in the first search result type.

7. The method of claim 1, wherein at least some of the first portion of the data is transmitted to the mobile device for display by the mobile device before transmission of the second portion of the data is complete.

8. The method of claim 1, further comprising receiving, from the mobile device, an instruction to execute transmission of the second portion of the data after the first portion of the data has been fully transmitted, wherein transmitting the second portion of data is performed in response to receiving the instruction.

9. The method of claim 1, further comprising receiving, from the mobile device, an instruction to execute transmission of the second portion of the data before the first portion of the data has been fully transmitted, wherein transmitting the second portion of data is performed in response to receiving the instruction.

10. The method of claim 1, wherein the first communication session is interrupted, and wherein the second communication session includes data that was not included in the first communication session.

11. The method of claim 1, wherein the second communication session contains more data than the first communication session.

12. A method, comprising:
  transmitting a request for data from a mobile communication device to the server, the request being for a first type of data;
  receiving, at the mobile communication device and from the server, a first portion of data associated with the request, wherein the first portion of data is of the first type of data;
  displaying, on the mobile communication device, the first portion of data associated with the request;
  after displaying at least some of the first portion of data, receiving, at the mobile communication device from the server, a second portion of data in a communication session associated with the request, wherein the second portion of data is of a second type of data; and
  displaying, on the mobile communication device, the second portion of data.

13. The method of claim 12, wherein the receiving is carried out by a non-browser application.

14. The method of claim 12, further comprising receiving a selection of a result element in response to display of the first portion of data or the second portion of data, and generating a telephone connection in response to the selection.

15. The method of claim 12, further comprising receiving, at the mobile communication device, a user request to view the second portion of data while the first portion of data is being displayed,
  the mobile communication device displays the second portion of data in response to having received the user request to view the second portion of data while the first portion of data was being displayed.

16. A non-transitory computer storage medium encoded with a computer program, the program comprising instructions that when executed by one or more computer devices cause the one or more computing devices to perform operations, comprising:
  receiving a request for a first type of data among the data that is responsive to a data request;
  identifying data that is responsive to the data request;
  identifying at least a first portion of the data that is of the first type of data and a second portion of the data that is of a second type of data;
  transmitting, during a first communication session at a first time, the first portion of the data to a mobile device for display on the mobile device; and
  transmitting, during a second communication session at a second time after the first time and while the first portion of the data is being displayed on the mobile device, the second portion of the data to the mobile device for display on the mobile device.

17. The non-transitory computer storage medium of claim 16, wherein the second communication session comprises a hypertext transfer protocol (HTTP) communication session.

18. The non-transitory computer storage medium of claim 16, wherein the data request comprises a search request.

19. The non-transitory computer storage medium of claim 16, the operations further comprising:
  receiving, from the mobile device, an instruction to execute transmission of the second portion of the data after the first portion of the data has been fully transmitted, wherein transmitting the second portion of data is performed in response to receiving the instruction.

20. The non-transitory computer storage medium of claim 16, the operations further comprising:
  receiving, from the mobile device, an instruction to execute transmission of the second portion of the data before the first portion of the data has been fully transmitted, wherein transmitting the second portion of data is performed in response to receiving the instruction.

* * * * *